United States Patent
Rehr et al.

(10) Patent No.: US 6,868,820 B2
(45) Date of Patent: Mar. 22, 2005

(54) SEALING SYSTEM FOR AN INTERNAL-COMBUSTION ENGINE

(75) Inventors: Antonius Rehr, Weissach (DE); Frank Maier, Ditzingen (DE); Markus Huber, Munich (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/678,748

(22) Filed: Oct. 6, 2003

(65) Prior Publication Data

US 2004/0135321 A1 Jul. 15, 2004

Related U.S. Application Data

(63) Continuation of application No. PCT/EP02/03291, filed on Mar. 23, 2002.

(30) Foreign Application Priority Data

| Apr. 5, 2001 | (DE) | 101 16 943 |
| Jul. 7, 2001 | (DE) | 101 33 188 |

(51) Int. Cl.⁷ .............................................. F01M 1/00
(52) U.S. Cl. .................................. 123/196 R; 277/591
(58) Field of Search ...................... 123/196 R; 277/591, 277/598, 626, 641, 644, 647, 648

(56) References Cited

U.S. PATENT DOCUMENTS

5,467,843 A   11/1995   Esch et al. .................... 184/6.5

FOREIGN PATENT DOCUMENTS

| DE | 1808621 | 7/1970 | |
| DE | 29712759 U1 * | 9/1997 | ............ F02F/11/00 |
| DE | 19636130 A | 3/1998 | |
| FR | 2 023 153 | 8/1970 | |
| JP | 08277938 | 10/1996 | |
| NL | 250150 | 4/1960 | |

* cited by examiner

*Primary Examiner*—Noah P. Kamen
(74) *Attorney, Agent, or Firm*—Crowell & Moring LLP

(57) ABSTRACT

A sealing system for an internal-combustion engine is provided in which a lubricating-oil-carrying space particularly an oil catching space, is separated by wall elements from adjoining space sections, which wall elements have elastic sealing elements for sealing off the spaces. For the compensation of sealing gap tolerances, a sealing element is provided which has at least two sealing arms which come to rest on the space wall to be sealed off. Despite larger sealing gap tolerances, a secure oil-tight separation of spaces is thereby provided.

12 Claims, 6 Drawing Sheets

SEALING SYSTEM FOR AN INTERNAL-COMBUSTION ENGINE

This application is a continuation of PCT Application No. PCT/EP02/03291 filed on Mar. 23, 2002, which claims priority of German Application No. DE 101 16 943.4 filed Apr. 5, 2001 and German Application No. DE 101 33 188.6 filed Jul. 7, 2001.

BACKGROUND AND SUMMARY OF THE INVENTION

The invention relates to a sealing system for an internal-combustion engine. Preferred embodiments of the invention relate to a sealing system for an internal-combustion engine, in which a lubricating oil catching space is separated by wall elements from adjoining space sections, which wall elements have elastic sealing elements for sealing off the spaces.

It is generally customary to separate oil-carrying space sections in an internal-combustion engine by means of corresponding sealing elements in order to thereby prevent an undesirable transfer of lubricating oil. In U.S. Pat. No. 5,467,843, for example, an intermediate shaft disposed below the crankshaft is separated by means of wall cross-struts. At the edges of these cross-struts, sealing elements are inserted in a groove, by means of which sealing elements, the two spaces are sealed off. However, it is a problem when major sealing gap tolerances are to be compensated, particularly as a result of the mounting or assembly of the engine structure. When conventional sealing elements are used which have, for example, a circular cross-section, in the case of sealing gap tolerances, either the two components are no longer reliably sealed off or a sealing pressure takes place which, for example, when plastic parts are used, generates sealing forces in the main force closure which may damage the plastic part.

It is therefore an object of the invention to further develop a sealing device which can be used for shutting-of or sealing-off oil-guiding space sections and which, despite existing sealing gap tolerances of, for example, +/–2 to 3 mm, ensures a reliable sealing off of the oil space or spaces.

This object of the invention is achieved by providing a sealing system for an internal-combustion, in which a lubricating oil catching space is separated by wall elements from adjoining space sections, which wall elements have elastic sealing elements for sealing off the spaces, wherein a sealing element is provided for compensation of sealing gap tolerances which has at least two sealing arms which in use abuttingly engage a space wall to be sealed off.

By means of a sealing device equipped with at least two sealing arms, sealing gap tolerances can be compensated so that, despite existing sealing gaps, the oil-carrying space or spaces are securely sealed off. As a result of the fact that the two sealing arms rest elastically or flexibly in the secondary force closure against the space wall to be sealed off, no excessive sealing forces are generated so that the sealing element according to the invention is suitable particularly for sealing off plastic components or similar devices.

This specification and the following claims describe additional advantageous further developments and improvements of the sealing system according to preferred embodiments of the invention for an internal-combustion engine.

A particularly advantageous embodiment of a sealing profile is obtained when the cross-section of the sealing elements is Y-shaped.

Sealing elements according to the preferred embodiments of the invention are particularly suitable for separating two oil suction spaces from one another in an internal-combustion engine. In this case, the oil shut-off wall provided with the sealing element is arranged between an oil suction pipe and an oil barrier insertion part which separates the two oil suction spaces from one another.

For packaging reasons, the oil suction pipe is constructed in two parts according to certain preferred embodiments of the invention, that is, of a base part and of a flat cover part closing an opening of the base part. As a result, the oil pan can be flanged directly to the crankcase without having to change, for example, the space of the oil pan because of the oil suction pipe.

For optimizing the flow of the suctioned-off lubricating oil, two spillway-type projections are provided on the interior side of the cover part according to certain preferred embodiments of the invention.

Two embodiments of the invention will be explained in detail in the following description and drawing.

Other objects, advantages and novel features of the present invention will become apparent from the following detailed description of the invention when considered in conjunction with the accompanying drawings.

DETAILED DESCRIPTION OF THE DRAWINGS

Figure 1:
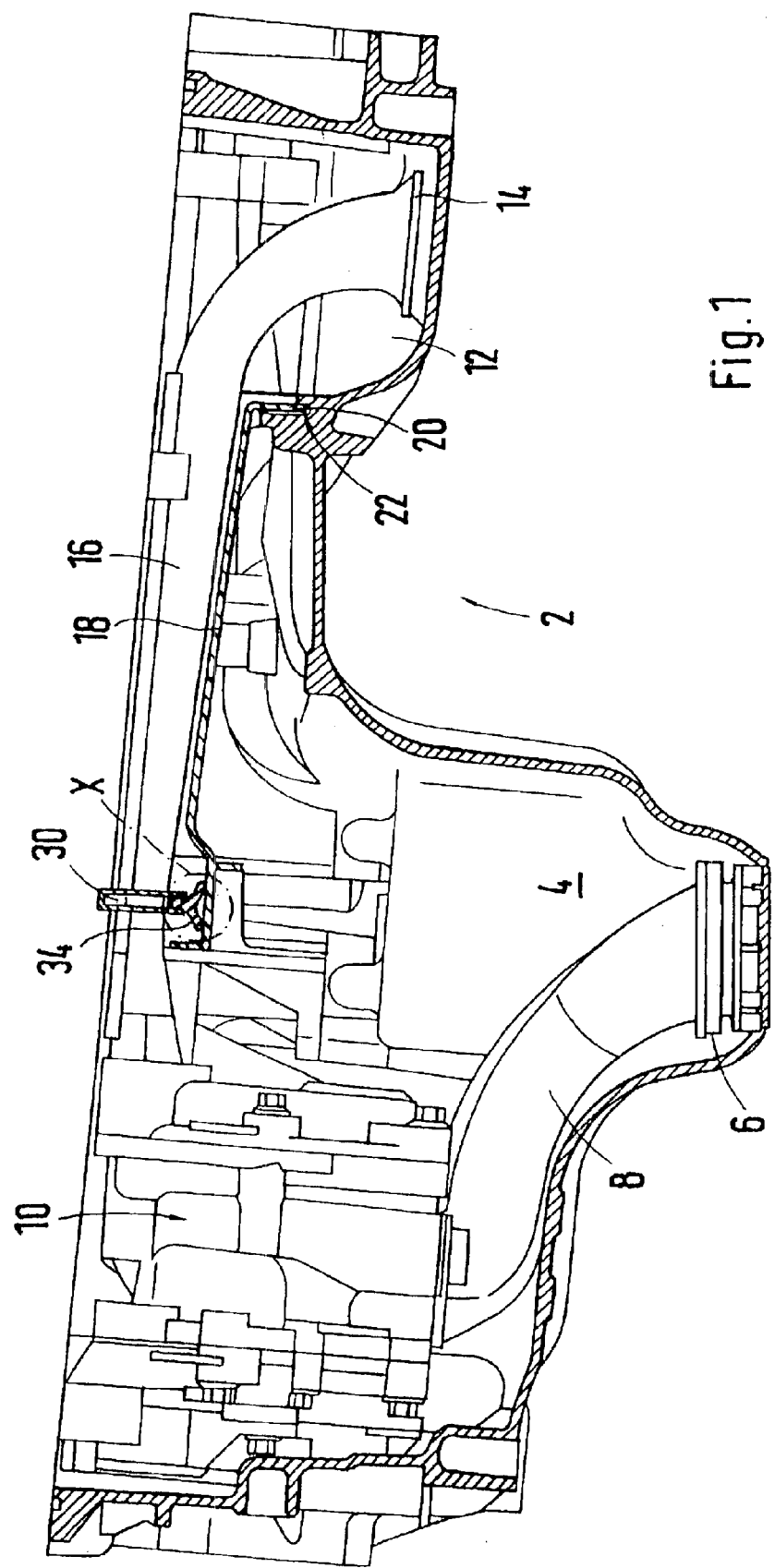
FIG. 1 is a longitudinal sectional view of an oil guiding housing of an internal-combustion engine and sealing system constructed according to preferred embodiments of the invention.
Figure 2:
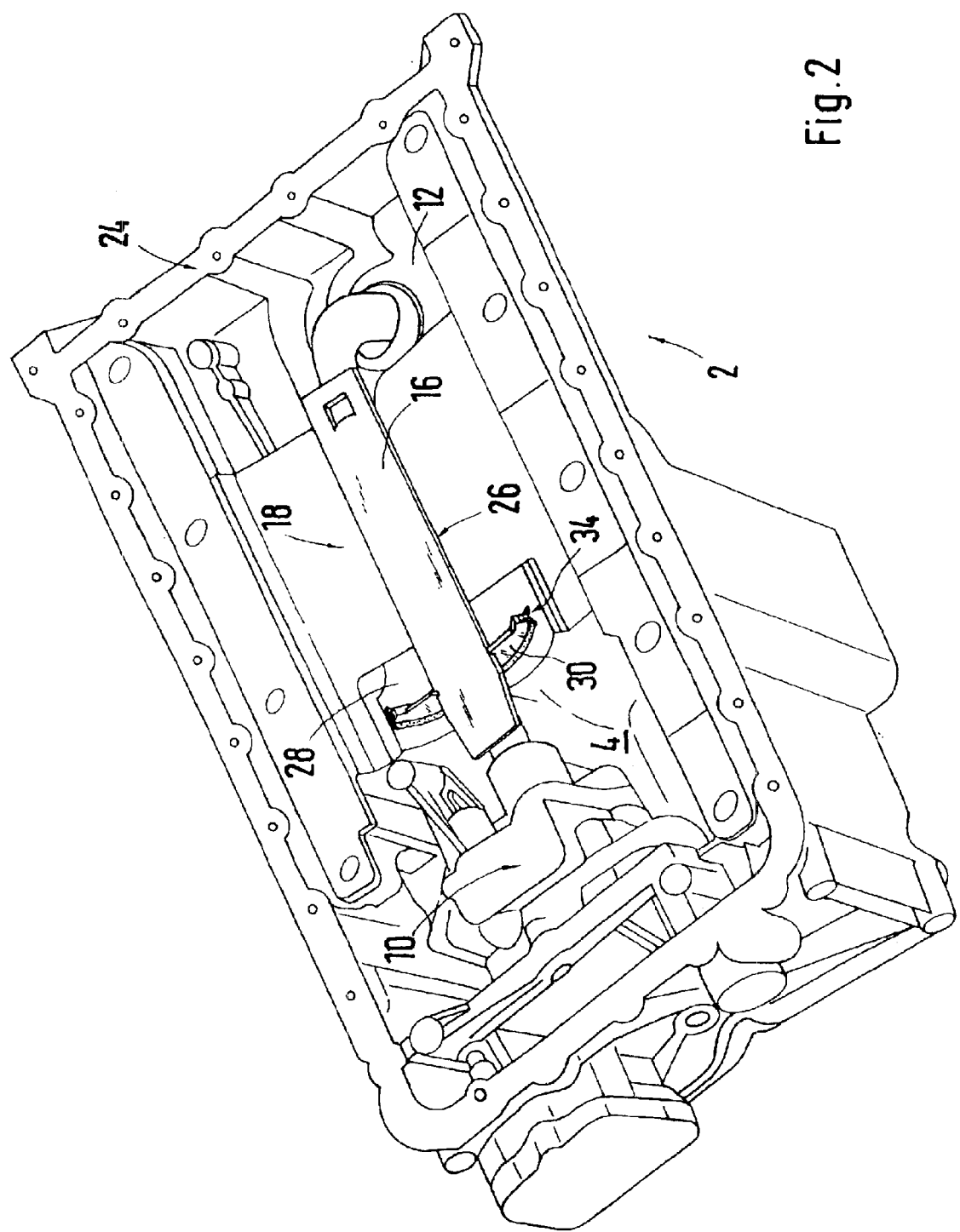
FIG. 2 is a top perspective view of the oil guiding housing of FIG. 1.
Figure 3:
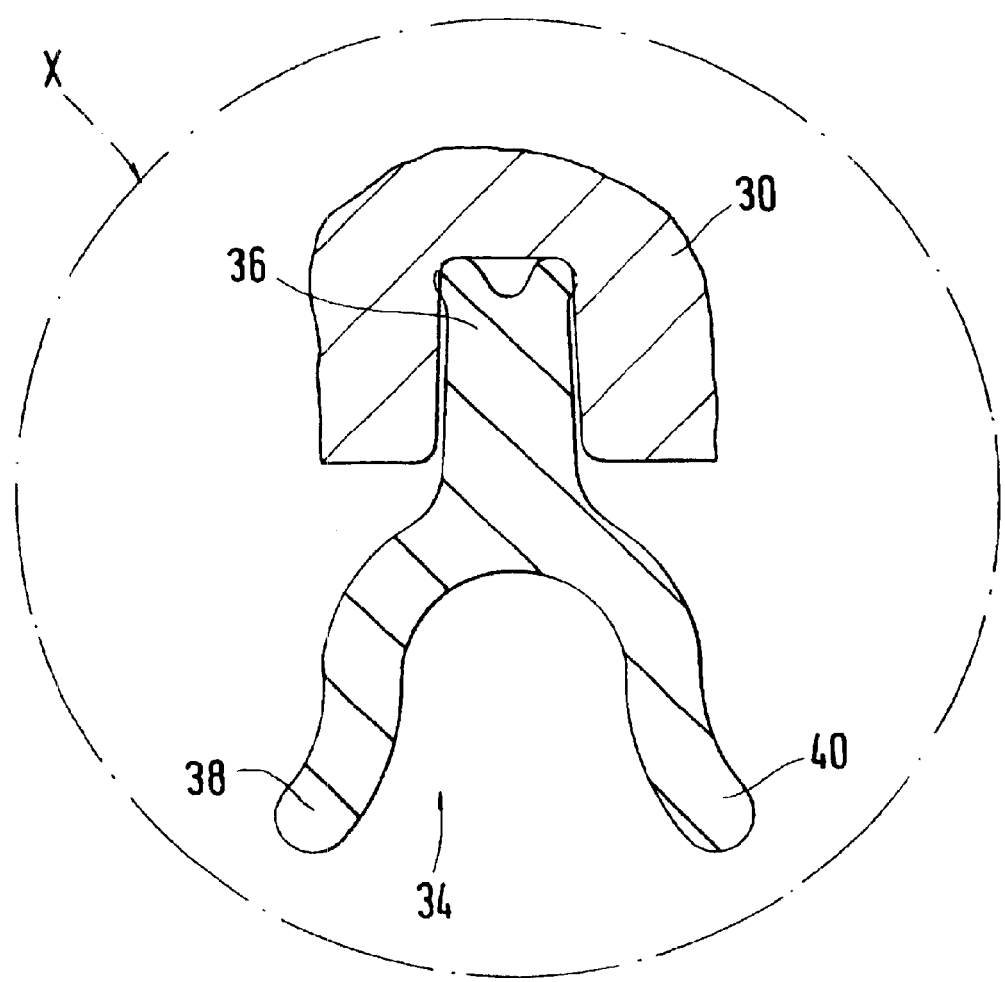
FIG. 3 is an enlarged view X of the sealing element in FIG. 1.
Figure 4:
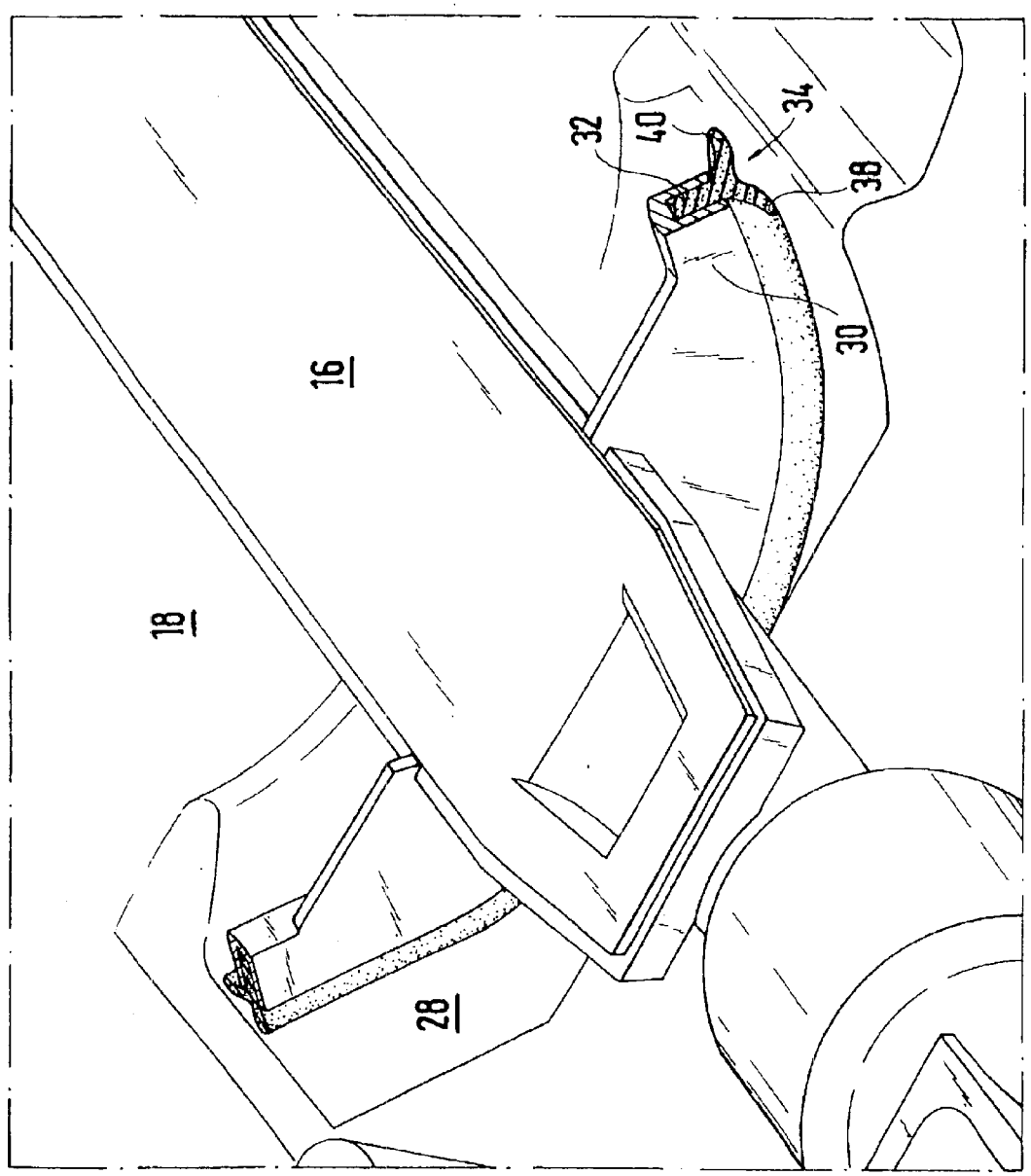
FIG. 4 is an enlarged partial view in the area of the sealing point of the sealing system of FIGS. 1–3.

An oil catching housing 2 has a space section 4 which, in the following, will be called a first oil collecting space and in which the oil collects which is required for the lubricating oil supply of the internal-combustion engine. In the first oil collecting space 4, a snorkel 6 is placed at its lowest point, which snorkel 6 leads by way of a first oil suction pipe 8 to the suction side of an oil pump 10. In the oil catching housing 2, a second space 12 is situated which in the following is called a second oil collecting space and which has a flatter construction than the first collecting space 4. In the second oil collecting space 12, an oil snorkel 14 is also arranged at its lowest point, which oil snorkel 14 is connected by way of a second oil suction pipe 16 with a second suction side of the oil pump 10 constructed as a double pump.

A plastic insertion part 18 is inserted in the oil catching housing 2, which plastic insertion part 18, in the installed condition, separates the two oil collecting spaces 4, 12 from one another. The insertion part 18 has a rearward side wall 20 which engages in a holding groove 22 arranged on the bottom of the oil catching housing 2 and extends transversely to the longitudinal course of the oil catching housing 2. This groove and tongue connection is additionally sealed off by silicone or flexible foam because it is to be prevented that, during an inclined position of the motor vehicle, lubricating oil from the first oil collecting space 4 flows into the second oil collecting space 12. In contrast, in an inclined position of the engine, the lubricating oil situated in the first oil collecting space 4 can flow under the insertion part 18. As a result, this space section is also utilized for receiving the oil volume required for a reliable lubricating oil supply.

The oil suction pipe 16 extends above the insertion part 18, which operates as an oil-tight shut-off wall between the two oil suction spaces 4, 12. So that the oil suction pipe 16 does not protrude beyond the flange surface 24 of the oil catching housing 2, a duct 26 with a circular-arc-shaped cross-section, in which the oil suction pipe 16 is accommodated, is provided on the top side of the insertion part 18. On the face of the insertion part 18 facing the oil pump 10, the receiving duct 26 changes into an also circular-arc-shaped recess 28. A plastic separating element 30 fastened to the oil suction pipe 16 engages in this recess 28. The corresponding face of the separating element 30 adapted to the contour of the recess 28 has a receiving groove 32 in which an elastomer sealing element 34 is received as an oil-tight separation between the oil suction pipe 16 and the plastic insertion part 18. The omega-shaped sealing element 34 has a sealing web 36 which is clampingly received in the groove 32 of the separating element 30. Furthermore, the sealing element 34 has two sealing arms 38 and 40 which, in the installed condition, rest sealingly against the surface of the recess 28 of the plastic insertion part 18. Because of the omega-shaped cross-sectional profile of the sealing element 34, sealing gap tolerances of approximately +/−2.5 mm can be absorbed or compensated. For the sealing-off with respect to the plastic insertion part 18, the two sealing arms 38 and 40 operate in the secondary force closure, so that the forces which are introduced by way of the sealing element 34 into the plastic insertion part 18 are low and do not damage the plastic insertion part 18.

In the present embodiment, the sealing gap tolerances are a result of the assembly sequence: The oil pump 10 together with the oil suction pipe 16 is mounted on a crankcase bottom half, which is not shown, while the plastic insertion part 18 is screwed into the oil guiding housing 2. As a result of the ψ or Y-shaped sealing element 34, such tolerances can be securely and reliably compensated. Thus, despite the oil suction pipe 16 traversing the plastic insertion part 18, it is ensured that, when the internal-engine is in an inclined position, the lubricating oil situated in the first oil collecting space 4 cannot flow into the rearward second oil collecting space 12.

Figure 5:
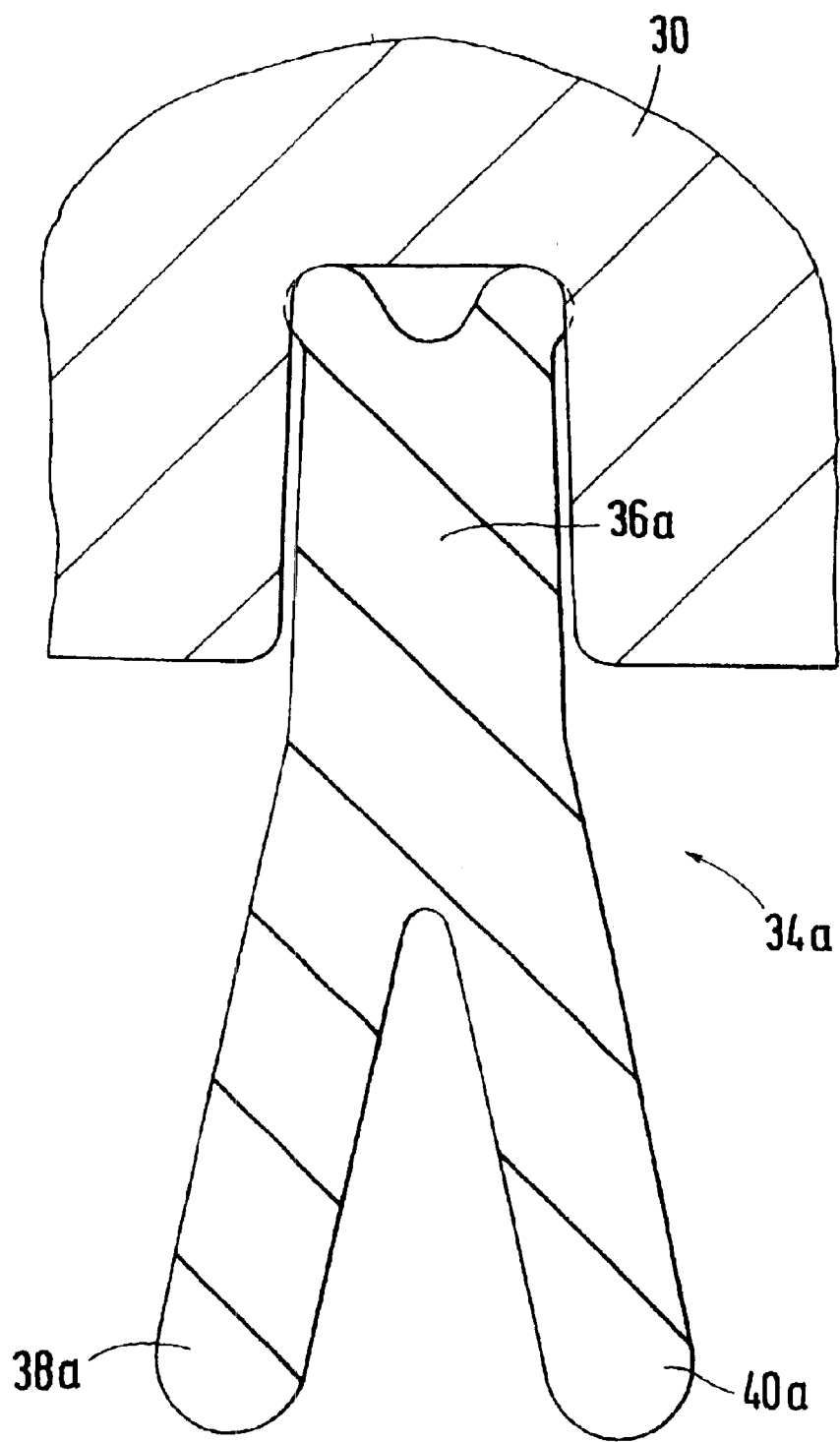
FIG. 5 is a sectional view of a second embodiment of the sealing element.

A second embodiment of an elastomer sealing element 34a is illustrated in FIG. 5. The Y-shaped sealing element 34a, in turn, has a sealing web 36a which is received in the groove 32 of the separating element 30. The two sealing arms 38a and 40a, in turn, in the installed condition, rest sealingly against the surface of the recess 28 of the plastic insertion part 18.

Figure 6:
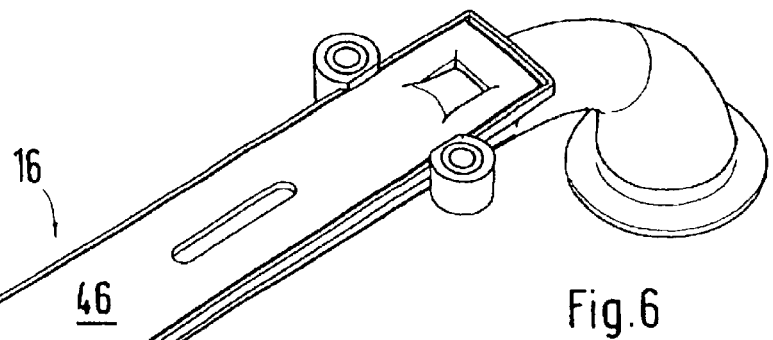
FIG. 6 is a view of an oil suction pipe with a cover element, constructed according to a preferred embodiment of the present invention.
Figure 7:
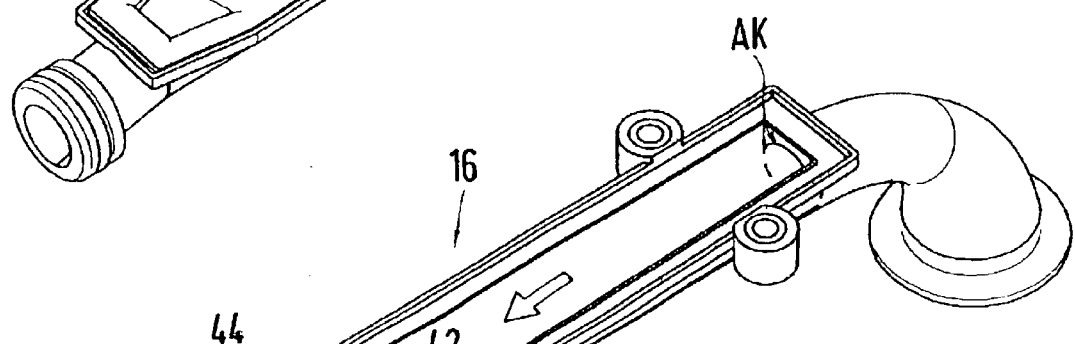
FIG. 7 is a view of the oil suction pipe of FIG. 6 without a cover element.
Figure 8:
FIG. 8 is a view of the cover element of the oil suction pipe of FIG. 7.

The oil suction pipe 16 illustrated in detail in FIGS. 6 to 8 is constructed in two parts and consists of a base part 44 having an opening 42, the opening 42 being closed off by a flatly constructed cover 46. The cover 46 is frictionally welded to the base part 44 and securely seals off the opening 42. For optimizing the flow of the lubricating oil suctioned off from the second oil collection space 12, one spillway-type projection 48 and 50 respectively is arranged on the interior side of the cover 46 at the start and at the end. Because of the flow direction of the lubricating oil illustrated in FIG. 7, a breakaway edge AK is formed when the lubricating oil enters the opening 42 forming a chamber. As a result of the projection 48 engaging in the opening 42 (in the mounted condition), this breakaway edge is eliminated and, without being swirled or dammed up, the lubricating oil can be transmitted to the outlet 52 of the oil suction pipe 16. Analogously, a retaining edge SK is formed at the outlet of the opening 42 forming the chamber. By means of the projection 50 engaging in the opening 42, the oil flow is directed by way of the projection 50 into the center of the flow cross-section, whereby the retaining edge is eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Sealing system for an internal-combustion engine, in which a lubricating-oil catching space is separated by wall elements from adjoining space sections, said sealing system comprising the combination of a sealing element and a wall element receiving the sealing element, which wall elements have elastic sealing elements for sealing off the spaces, wherein the sealing element is provided for compensation of sealing gap tolerances which has at least two sealing arms which in use abuttingly engage a space wall to be sealed off, wherein the sealing element in use is operable to separate two oil suction spaces in an internal-combustion engine, and.

wherein the wall element receiving the sealing element is arranged between an oil suction pipe and an insertion part, the insertion part separating the two oil suction spaces from one another.

2. Sealing system according to claim 1, wherein the sealing element has a Y-shaped cross-section.

3. Sealing system according to claim 2, wherein the oil suction pipe consists of a base part which has an opening which is closed by a cover part.

4. Sealing system according to claim 3, wherein two spillway-type projections are provided on an interior side of the cover part for optimizing the flow.

5. Sealing system according to claim 1, wherein the oil suction pipe consists of a base part which has an opening which is closed by a cover part.

6. Sealing system according to claim 5, wherein two spillway-type projections are provided on an interior side of the cover part for optimizing the flow.

7. An internal combustion engine assembly comprising:
a first lubricating oil space,
a second lubricating oil space, and
a sealing element operable to seal said first and second oil spaces from each other,
wherein the sealing element is a unitary flexible plastic member which has two sealing arms abuttingly engageable with a wall member of said oil spaces, and
wherein a wall element receiving the sealing element is arranged between an oil suction nine and an insertion part, the insertion part separating the two oil suction spaces from one another.

8. An assembly according to claim 7, wherein the sealing element has a Y-shaped cross-section.

9. An assembly according to claim 7, wherein the oil suction pipe consists of a base part which has an opening which is closed by a cover part.

10. An assembly according to claim 9, wherein two spillway-type projections are provided on an interior side of the cover part for optimizing the flow.

11. An assembly according to claim 10, wherein the sealing element has a Y-shaped cross-section.

12. An assembly according to claim 9, wherein the sealing element has a Y-shaped cross-section.

* * * * *